(12) United States Patent
Lu et al.

(10) Patent No.: US 11,301,055 B2
(45) Date of Patent: Apr. 12, 2022

(54) KEYBOARD DEVICE AND PERIPHERAL DEVICE

(71) Applicant: DEXIN CORPORATION, New Taipei (TW)

(72) Inventors: Ho-Lung Lu, New Taipei (TW); Pai-Yang Chou, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 0 days.

(21) Appl. No.: 17/170,807

(22) Filed: Feb. 8, 2021

(65) Prior Publication Data

US 2022/0083150 A1  Mar. 17, 2022

(30) Foreign Application Priority Data

Sep. 11, 2020  (TW) ................................ 109131362

(51) Int. Cl.
G06F 3/02  (2006.01)

(52) U.S. Cl.
CPC ............ G06F 3/021 (2013.01); G06F 3/0219 (2013.01); G06F 3/0227 (2013.01)

(58) Field of Classification Search
CPC ...... G06F 3/0202; G06F 1/1656; G06F 3/023; G06F 3/03543; H04B 4/0081; H04M 3/42365; H04W 4/12; H04Q 7/005; H02J 50/70; H02J 7/345
See application file for complete search history.

(56) References Cited

U.S. PATENT DOCUMENTS

| | | | | |
|---|---|---|---|---|
| 4,680,572 A | * | 7/1987 | Meguire | G06F 3/023 341/24 |
| 5,706,028 A | * | 1/1998 | Murakami | G06F 3/03543 345/157 |
| 2010/0127660 A1 | * | 5/2010 | Cook | H01Q 7/005 320/108 |
| 2012/0306282 A1 | * | 12/2012 | Tan | H04B 5/0081 307/104 |
| 2013/0329396 A1 | * | 12/2013 | Smith | G06F 1/1656 362/23.03 |
| 2014/0054974 A1 | * | 2/2014 | Bilbrey | H02J 50/70 307/104 |
| 2014/0057610 A1 | * | 2/2014 | Olincy | H04M 3/42365 455/414.1 |
| 2014/0156772 A1 | * | 6/2014 | Eaton | H04W 4/12 709/206 |
| 2015/0263540 A1 | * | 9/2015 | Culbert | H02J 7/345 713/300 |
| 2018/0181211 A1 | * | 6/2018 | Chang | G06F 3/0202 |

\* cited by examiner

Primary Examiner — Stephen T. Reed
(74) Attorney, Agent, or Firm — Li & Cai Intellectual Property Office

(57) ABSTRACT

A keyboard device having a wireless charging function and a peripheral device are provided. The keyboard includes a casing module, a processing module, a key module, a first secondary resonant circuit and a second secondary resonant circuit. The processing module is electrically connected to the key module. The first secondary resonant circuit is disposed on a first side of the casing module. The second secondary resonant circuit is disposed on a second side of the casing module.

14 Claims, 7 Drawing Sheets

KEYBOARD DEVICE AND PERIPHERAL DEVICE

CROSS-REFERENCE TO RELATED PATENT APPLICATION

This application claims the benefit of priority to Taiwan Patent Application No. 109131362, filed on Sep. 11, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a keyboard device and a peripheral device, and more particularly to a keyboard device having a wireless charging function and a peripheral device.

BACKGROUND OF THE DISCLOSURE

Nowadays, computer peripheral devices such as keyboard devices and mouse devices need to be connected to a host computer by a wire, leading to limited availability of usable space. Although wireless keyboards or wireless mice are commercially available, they require regular charging.

Accordingly, providing a keyboard device having a wireless charging function and a peripheral device has become an important issue in the related art.

SUMMARY OF THE DISCLOSURE

In response to the above-referenced technical inadequacies, the present disclosure provides a keyboard device. The keyboard device includes a casing module, a processing module, a key module, a first secondary resonant circuit, and a second secondary resonant circuit. The key module includes a plurality of key units disposed in the casing module, and the processing module is electrically connected to the key module. The first secondary resonant circuit is disposed in the casing module and disposed on a first side of the casing module. The second secondary resonant circuit is disposed in the casing module and disposed on a second side of the casing module. The first side and the second side are opposite sides of the casing module. The first secondary resonant circuit or the second secondary resonant circuit provides electrical energy to the processing module and the key module.

In one aspect, the present disclosure provides a peripheral device. The peripheral device includes a keyboard device, a mouse device, and a mouse pad device. The keyboard device receives electrical energy in a wired manner. The keyboard device includes a processing module, a first primary resonant circuit disposed on a first side of the keyboard device, and a second primary resonant circuit disposed on a second side of the keyboard device, in which the first primary resonant circuit and the second primary resonant circuit are electrically connected to the processing module. The mouse device includes a mouse processing module and a mouse secondary resonant circuit, and the mouse processing module is electrically connected to the mouse secondary resonant circuit. The mouse pad device includes a mouse pad body and a mouse pad secondary resonant circuit, and the mouse pad secondary resonant circuit is disposed in the mouse pad body. When the mouse device and the keyboard device are disposed on the mouse pad device, the first primary resonant circuit or the second primary resonant circuit of the keyboard device provides wireless electrical energy to the mouse pad secondary resonant circuit of the mouse pad device, and then the mouse pad secondary resonant circuit transmits the received wireless electrical energy to the mouse secondary resonant circuit of the mouse device.

In another aspect, the present disclosure provides a peripheral device. The peripheral device includes a keyboard device, a mouse device and a mouse pad device. The keyboard device includes a processing module, a first secondary resonant circuit disposed on a first side of the keyboard device, and a second secondary resonant circuit disposed on a second side of the keyboard device, in which the first secondary resonant circuit and the second secondary resonant circuit are electrically connected to the processing module. The mouse device receives electrical energy in a wired manner, and the mouse device includes a mouse processing module and a mouse primary resonant circuit. The mouse processing module is electrically connected to the mouse primary resonant circuit. The mouse pad device includes a mouse pad body and a mouse pad secondary resonant circuit, and the mouse pad secondary resonant circuit is disposed in the mouse pad body. When the mouse device and the keyboard device are disposed on the mouse pad device, the electrical energy received by the mouse device is provided to the mouse pad secondary resonant circuit through the mouse first resonant circuit, and then the mouse pad secondary resonant circuit transmits the received electrical energy to the first secondary resonant circuit or the second secondary resonant circuit of the keyboard device.

Therefore, one of the beneficial effects of the present disclosure is that, the peripheral device and the keyboard device provided in the present disclosure have a remote magnetic resonance wireless charging function that allows convenient usage and can effectively improve user experience.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings, in which.

DETAILED DESCRIPTION OF THE EXEMPLARY EMBODIMENTS

Figure 1:
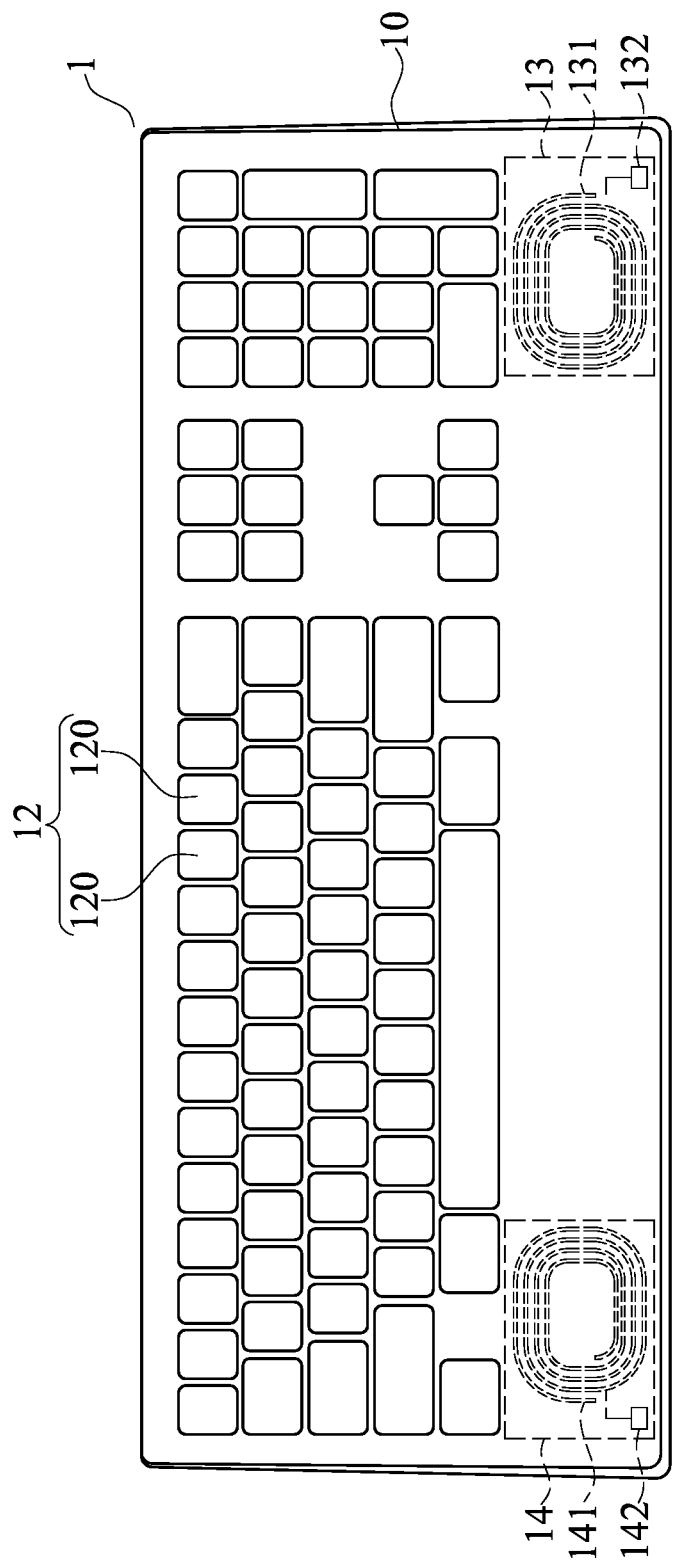
FIG. 1 is a schematic view of a keyboard device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
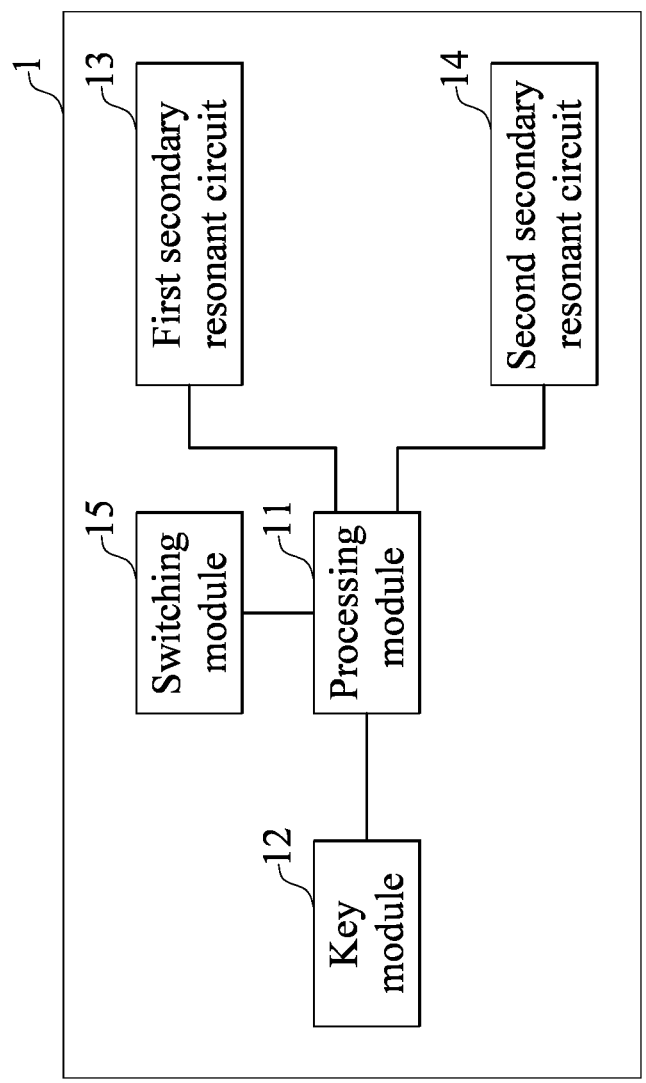
FIG. 2 is a block diagram of the keyboard device according to the first embodiment of the present disclosure.
Figure 3:
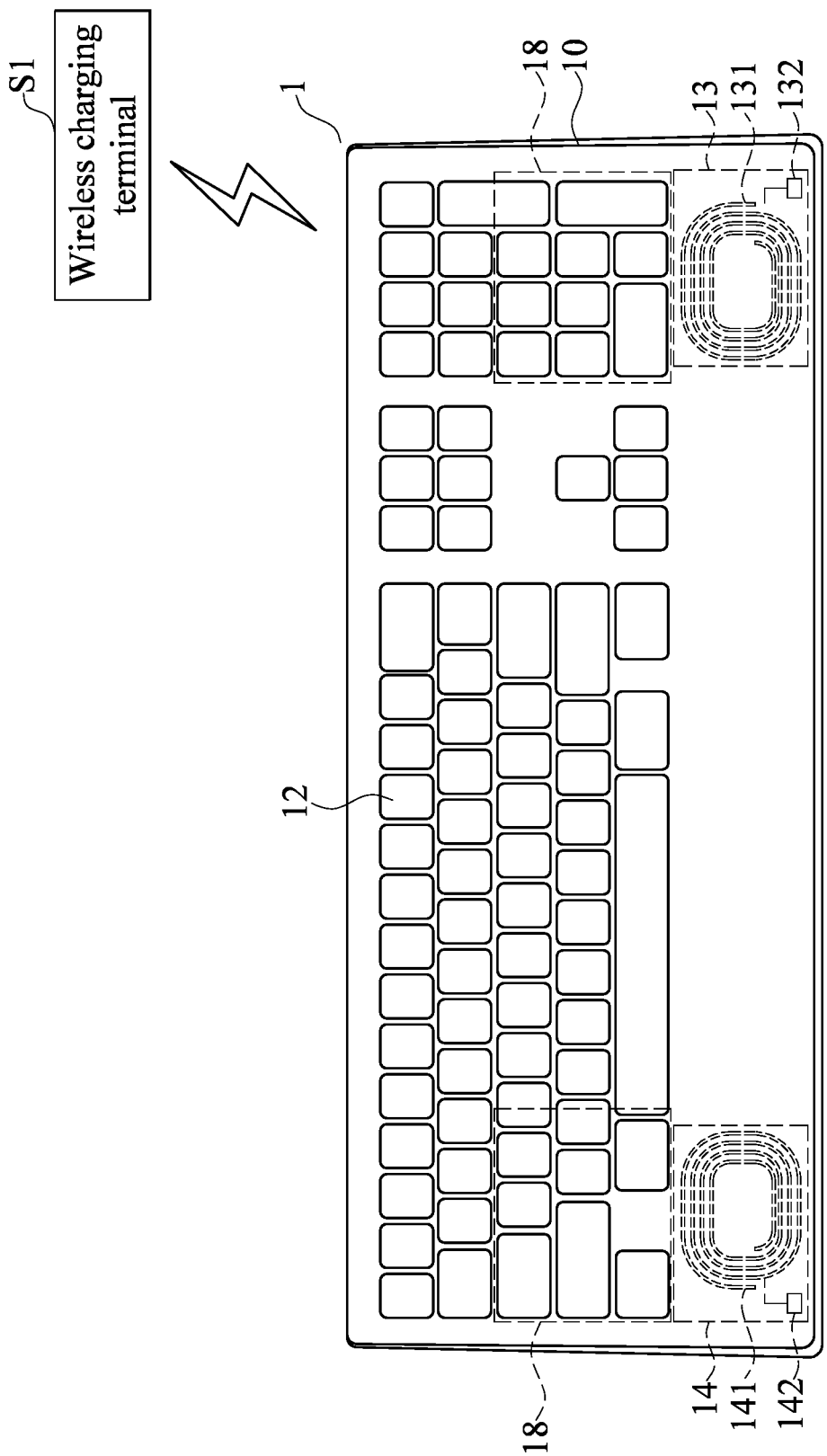
FIG. 3 is a schematic view of the keyboard device of FIG. 1 being matched with a shield module.

Referring to FIG. 1 to FIG. 3, FIG. 1 is a schematic view of a keyboard device according to a first embodiment of the present disclosure, FIG. 2 is a block diagram of the keyboard device according to the first embodiment of the present disclosure, and FIG. 3 is a schematic view of the keyboard device of FIG. 1 being matched with a shield module.

A keyboard device 1 includes a casing module 10, a processing module 11, a key module 12, a first secondary resonant circuit 13 and a second secondary resonant circuit 14.

Each of the first secondary resonant circuit 13 and the second secondary resonant circuit 14 is a secondary resonant circuit. That is, the first secondary resonant circuit 13 and the second secondary resonant circuit 14 cannot actively transmit electrical energy; instead, they passively receive the electrical energy, and then transmit the received electrical energy to electronic devices that need to be charged, or other secondary resonant circuits. That is, the secondary resonant circuit can be used only for a relay transmission of the electrical energy.

In addition, in the present disclosure, a primary resonant circuit can work together with a secondary resonant circuit. The primary resonant circuit is electrically connected to a power supply, converts the electrical energy provided by the power supply into electromagnetic wireless electrical energy, and transmits the electromagnetic wireless electrical energy to the secondary resonant circuit or another primary resonant circuit. That is, the primary resonant circuit can transmit or receive the electrical energy.

The key module 12 includes a plurality of key units 120 disposed in the casing module 10. The processing module 11 is electrically connected to the key module 12.

In the present embodiment, the first secondary resonant circuit 13 is disposed in the casing module 10 and disposed on a first side of the casing module 10. The second secondary resonant circuit 14 is disposed in the casing module 10 and disposed on a second side of the casing module 10. The first side and the second side of the casing module 10 are opposite sides of the casing module 10.

The first secondary resonant circuit 13 or the second secondary resonant circuit 14 provides the electrical energy to the processing module 11 and the key module 12. That is, the first secondary resonant circuit 13 and the second secondary resonant circuit 14 are electrically connected to the processing module 11 and the key module 12.

In the present embodiment, the keyboard device 1 further includes a switching module 15. The switching module 15 is electrically connected to the first secondary resonant circuit 13 or the second secondary resonant circuit 14.

The switching module 15 is used to switch the first secondary resonant circuit 13, the second secondary resonant circuit 14 or both the first secondary resonant circuit 13 and the second secondary resonant circuit 14 to receive wireless electrical energy. That is, the switching module 15 is disposed on the casing module 10, and the switching module 15 includes a two-stage or a three-stage switcher. Users can switch the switching module 15 so that the first secondary resonant circuit 13, the second secondary resonant circuit 14, or both the first secondary resonant circuit 13 and the second secondary resonant circuit 14 receive the wireless electrical energy.

In addition, the processing module 11 of the keyboard device 1 can also switch the first secondary resonant circuit 13 or the second secondary resonant circuit 14 to receive the wireless electrical energy according to a direction toward which a wireless power supply terminal S1 is disposed. That is, the processing module 11 first determines magnitudes of the electric energy received by the first secondary resonant circuit 13 and the second secondary resonant circuit 14 within a predetermined time interval. For example, when the processing module 11 determines that the first secondary resonant circuit 13 receives more electrical energy in the predetermined time interval, the processing module 11 is switched to use the first secondary resonant circuit 13 to receive the wireless electrical energy. When the processing module 11 determines that the second secondary resonant circuit 14 receives more electrical energy in the predetermined time interval, the processing module 11 is switched to use the second secondary resonant circuit 14 to receive the wireless electrical energy.

In the present embodiment, the first secondary resonant circuit 13 includes a first wireless charging coil unit 131 and a first resonant circuit unit 132. The first resonant circuit unit 132 is electrically connected to the first wireless charging coil unit 131. The second secondary resonant circuit 14 includes a second wireless charging coil unit 141 and a second resonant circuit unit 142. The second resonant circuit unit 142 is electrically connected to the second wireless charging coil unit 141. In the present embodiment, resonant parameters of the first resonant circuit unit 132 and the second resonant circuit unit 142 are matched with resonant parameters of the wireless power supply terminal.

Referring to FIG. 3, in addition, the keyboard device 1 further includes at least a shield module 18. The shield module 18 is in the shape of a flat plate disposed under the key module 12 to cover the plurality of key units 120 of the key module 12 adjacent to the first secondary resonant circuit 13 or the second secondary resonant circuit 14.

As shown in FIG. 3, the keyboard device 1 can include a plurality of shield modules 18, which are respectively disposed under the plurality of key units 120 of the key module 12 adjacent to the first secondary resonant circuit 13 or the second secondary resonant circuit 14. In another embodiment, the shield module 18 can be a large-area flat shield plate, which is disposed directly under all key units 120 of the key module 12. The shield module 18 includes a magnetic conducting plate (not shown in the figures) and a metal sheet (not shown in the figures). The metal sheet (not shown in the figures) is disposed on a surface of the magnetic conducting plate (not shown in the figures). The metal sheet (not shown in the figures) can be an aluminum foil or a copper foil. The shielding module 18 is used to shield an electromagnetic interference of the first secondary resonant circuit 13 or the second secondary resonant circuit 14, thereby reducing malfunctions of the key units 120 adjacent to the first secondary resonant circuit 13 or the second secondary resonant circuit 14 caused by the electromagnetic interference.

In another embodiment, in addition to the magnetic shielding arrangement on hardware, the plurality of key units 120 of the key module 12 of the keyboard device 1 adjacent to the first secondary resonant circuit 13 or the second secondary resonant circuit 14 can be electrically connected to the processing module 11 through an input and output circuit. That is, the plurality of key units 120 of the key module 12 adjacent to the first secondary resonant circuit 13 or the second secondary resonant circuit 14 utilize an input and output circuit using a single-wired communication protocol, such as a serial peripheral interface or an inter-integrated circuit, to avoid transmitting signals from multiple key units (not shown in the figures) at the same time due to a magnetic interference.

In addition, when the plurality of key units 120 of the key module 12 provide a plurality of key signals at the same time, that is, when the plurality of key units (not shown in the figures) of the key module 12 are disturbed by a magnetic force and transmit the plurality of key signals, the time interval is very small due to the plurality of key signals being caused by the magnetic interference, and a key combination includes key units (not shown in the figures) with similar positions. Therefore, the processing module 11 determines whether or not to transmit the plurality of key signals to a computer device according to a transmission time of the plurality of key signals and a position of each of the plurality of key units (not shown in the figures) and the key combination. When the transmission time of the plurality of key signals is too close, such as 1 ms, and the positions of each of the plurality of key units (not shown in the figures) and the key combinations are only 1-2 key units (not shown in the figures) apart, then the processing module 11 does not transmit the signals of these key units 120. That is, when the plurality of key units 120 provide a plurality of key signals in a short time interval, the processing module 11 filters or ignores these key signals. The short time interval can be configured to be less than 50 ms.

Second Embodiment

Figure 4:
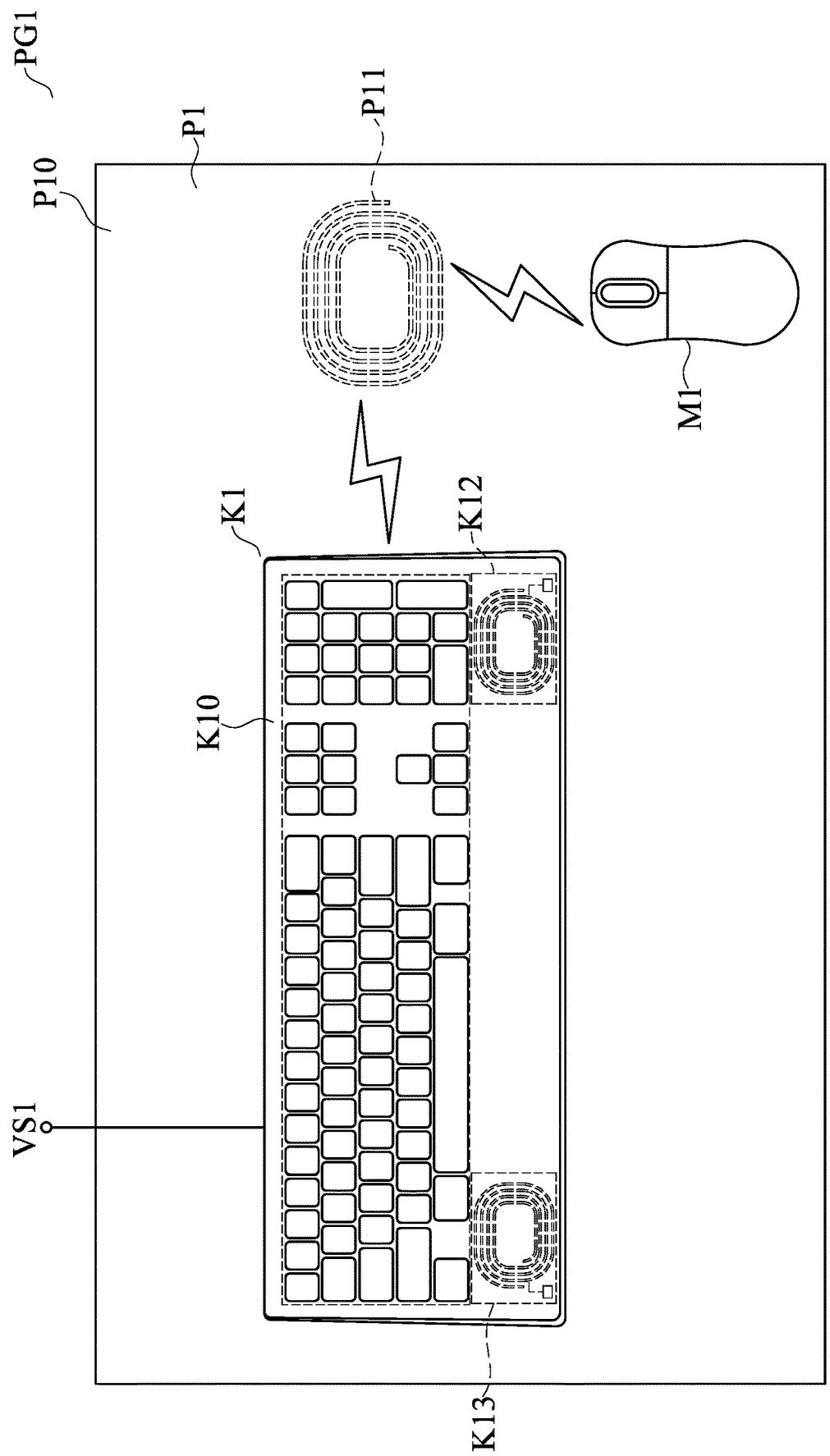
FIG. 4 is a schematic view of a peripheral device according to a second embodiment of the present disclosure.
Figure 5:
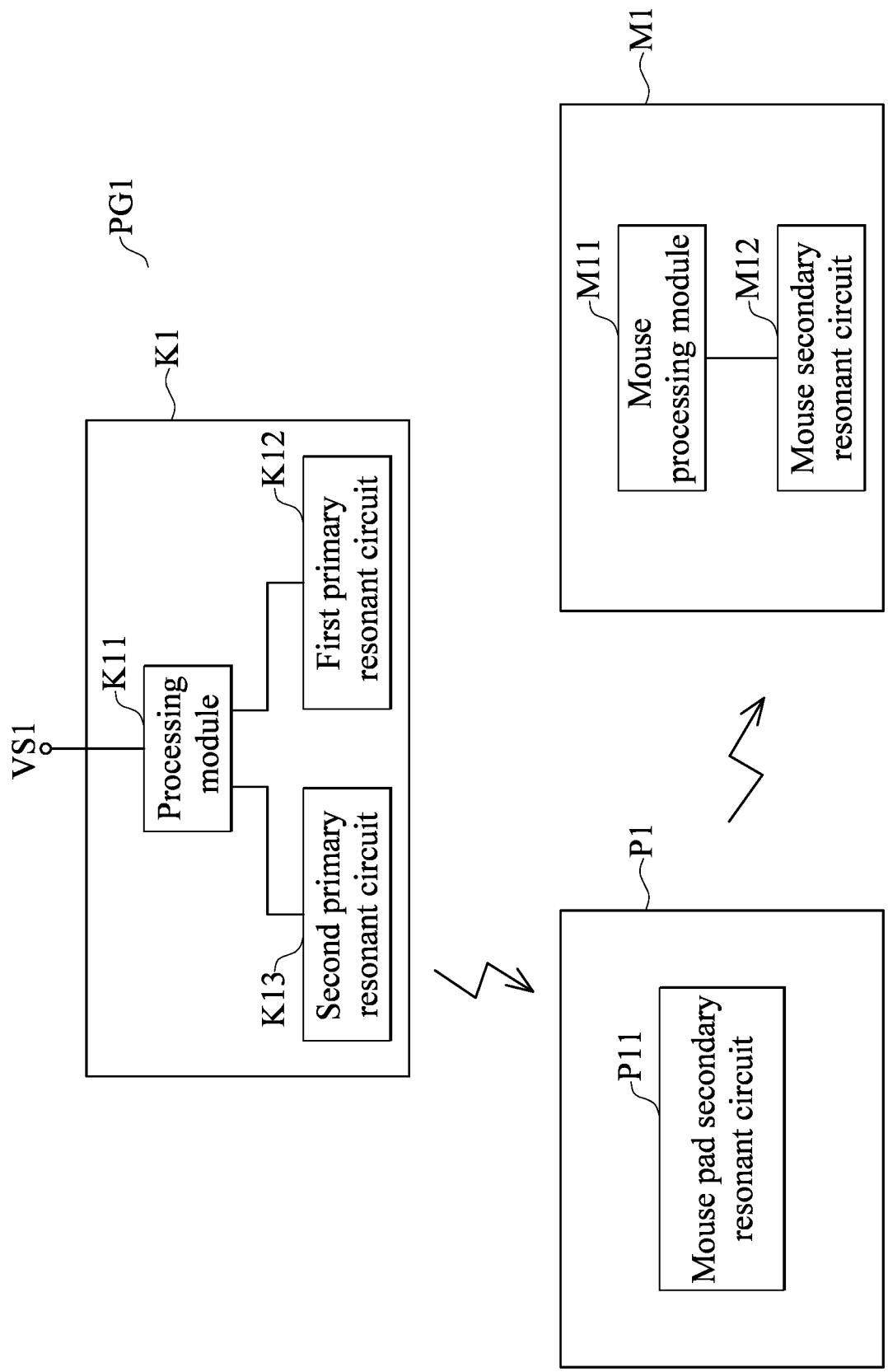
FIG. 5 is a functional block diagram of the peripheral device according to the second embodiment of the present disclosure.

Referring to FIG. 4 and FIG. 5, FIG. 4 is a schematic view of a peripheral device according to a second embodiment of the present disclosure, and FIG. 5 is a functional block diagram of the peripheral device according to the second embodiment of the present disclosure.

The peripheral device PG1 includes a keyboard device K1, a mouse device M1 and a mouse pad device P1.

The keyboard device K1 receives electrical energy in a wired manner. In the present embodiment, the keyboard device K1 can be connected to a universal serial bus (USB) port of a host computer or be electrically connected to a direct current (DC) or an alternative current (AC) power supply directly.

The keyboard device K1 includes a processing module K11, a first primary resonant circuit K12 and a second primary resonant circuit K13. That is, the keyboard device K1 can receive first electrical energy VS1, and transmit wireless electrical energy through the first primary resonant circuit K12 or the second primary resonant circuit K13.

Similarly, the keyboard device K1 further includes a casing module K10. The processing module K11, the first primary resonant circuit K12 and the second primary resonant circuit K13 are all disposed in the casing module K10. The first primary resonant circuit K12 is disposed on a first side of the keyboard device K1, that is, the first primary resonant circuit K12 is disposed on a first side of the casing module K10. The second primary resonant circuit K13 is disposed on a second side of the keyboard device K1, that is, the second primary resonant circuit K13 is disposed on a second side of the casing module K10. The first primary resonant circuit K12 and the second primary resonant circuit K13 are electrically connected to the processing module K11.

The first primary resonant circuit K12 and the second primary resonant circuit K13 of the keyboard device K1 are the same as the primary resonant circuit of the first embodiment, which receives the electrical energy through a wireless charging control circuit (not shown in the figures) of the primary resonant circuit, and then actively transmits the electrical energy to an electronic device or a secondary resonant circuit for a relay transmission of the electrical energy.

The mouse device M1 includes a mouse processing module M11 and a mouse secondary resonant circuit M12. The mouse processing module M11 is electrically connected to the mouse secondary resonant circuit M12.

The mouse pad device P1 includes a mouse pad body P10 and a mouse pad secondary resonant circuit P11. The mouse pad secondary resonant circuit P11 is disposed in the mouse pad body P10.

The mouse secondary resonant circuit M12 and the mouse pad secondary resonant circuit P11 are the same as the secondary resonant circuit of the first embodiment, and are mainly used for passively receiving the wireless electrical energy provided by the primary resonant circuit or the secondary resonant circuit.

In the present embodiment, when the mouse device M1 and the keyboard device K1 are disposed on the mouse pad device P1, the first primary resonant circuit K12 or the second primary resonant circuit K13 of the keyboard device K1 provides the wireless electrical energy to the mouse pad secondary resonant circuit P11 of the mouse pad device P1.

The mouse pad secondary resonant circuit P11 then transmits the received wireless electrical energy to the mouse secondary resonant circuit M12 of the mouse device M1.

That is, the keyboard device K1 transmits the electrical energy received through a USB port, a DC power supply or an AC power supply to the mouse pad secondary resonant circuit P11 of the mouse pad device P1 through the first primary resonant circuit K12 of the keyboard device K1, the second primary resonant circuit K13 of the keyboard device K1 or both the first primary resonant circuit K12 and the second primary resonant circuit K13 of the keyboard device K1.

The mouse pad secondary resonant circuit P11 of the mouse pad device P1 then transmits the received electrical energy to the mouse secondary resonant circuit M12 of the mouse device M1 to charge the mouse device M1. In another embodiment, the mouse device M1 can further include a battery module (not shown), which is used for charging with the wireless electrical energy received by the mouse secondary resonant circuit M12.

That is, in the present embodiment, the electrical energy can be transmitted from the mouse device M1 to the mouse pad device P1, and sequentially from the mouse pad device P1 to the keyboard device K1.

Third Embodiment

Figure 6:
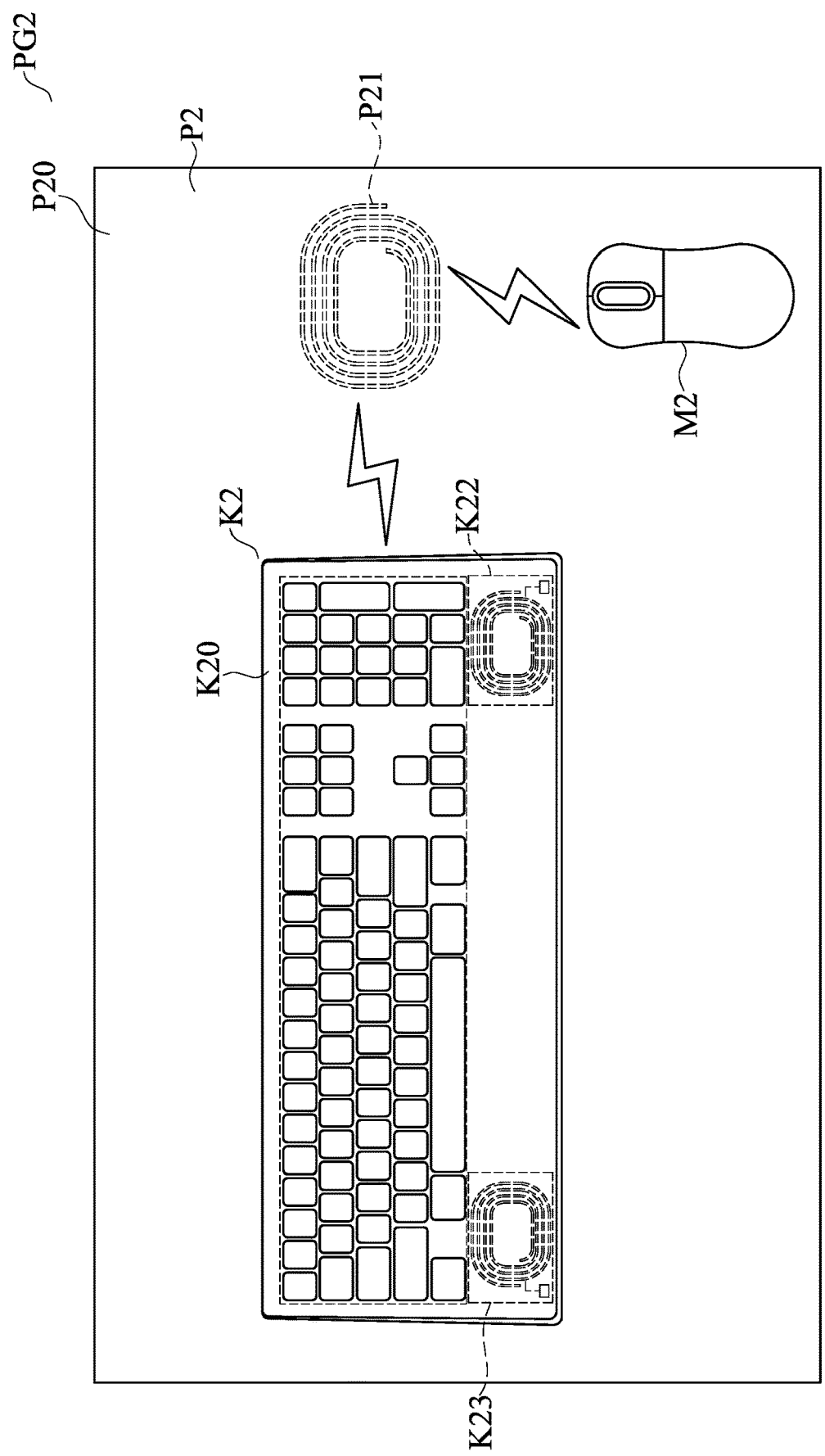
FIG. 6 is a block diagram of a peripheral device according to a third embodiment of the present disclosure.
Figure 7:
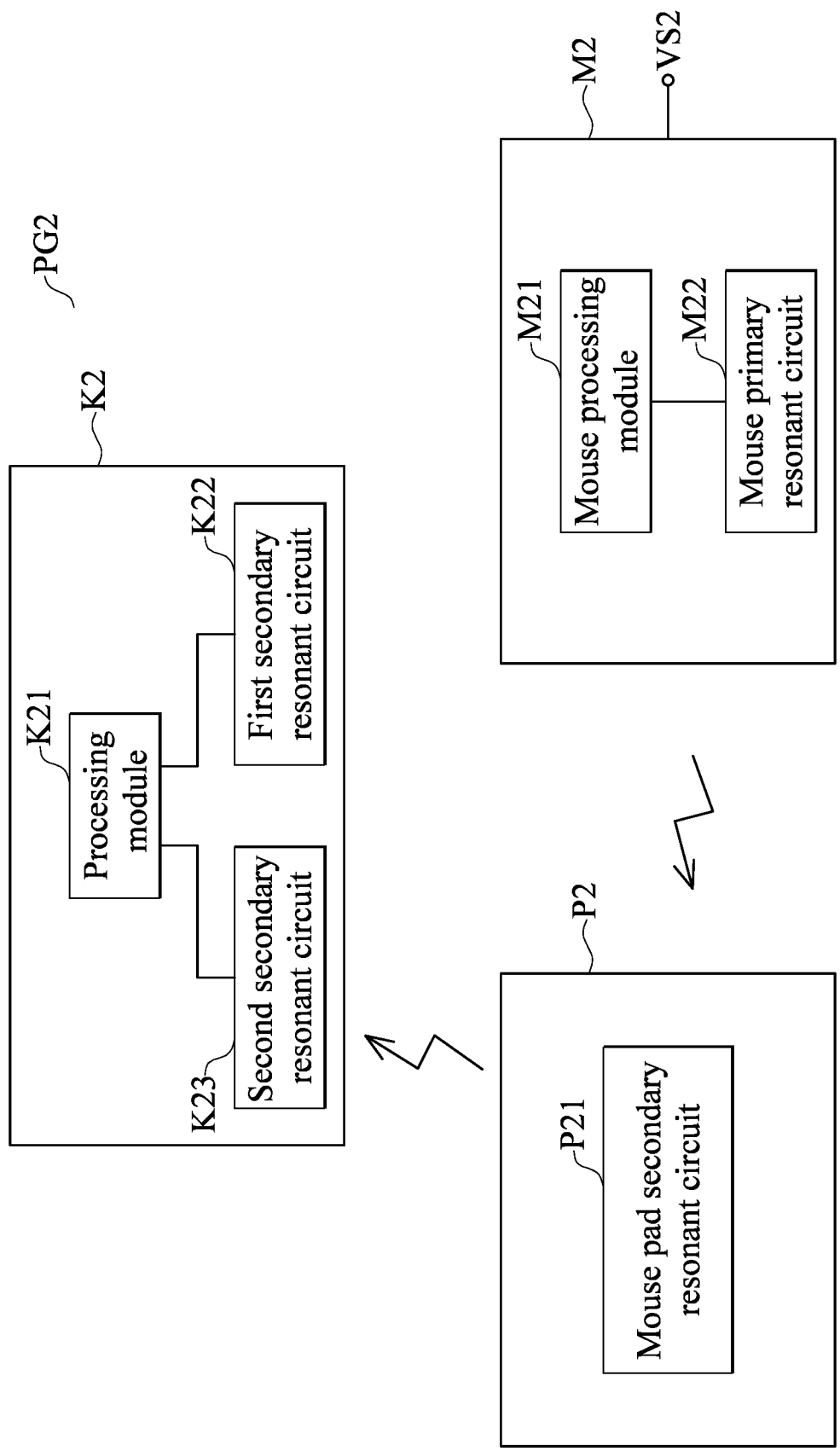
FIG. 7 is a functional block diagram of the peripheral device according to the third embodiment of the present disclosure.

Referring to FIG. 6 and FIG. 7, FIG. 6 is a block diagram of a peripheral device according to a third embodiment of the present disclosure, and FIG. 7 is a functional block diagram of the peripheral device according to the third embodiment of the present disclosure.

The peripheral device PG2 includes a keyboard device K2, a mouse device M2 and a mouse pad device P2.

Similarly, the keyboard device K2 further includes a casing module K20. A processing module K21, a first secondary resonant circuit K22 and a second secondary resonant circuit K23 are all disposed in the casing module K20.

The first secondary resonant circuit K22 is disposed on a first side of the keyboard device K2, that is, the first secondary resonant circuit K22 is disposed on a first side of the casing module K20. The second secondary resonant circuit K23 is disposed on a second side of the keyboard device K2, that is, the second secondary resonant circuit K23 is disposed on a second side of the casing module K20. The first secondary resonant circuit K22 and the second secondary resonant circuit K23 are electrically connected to the processing module K21.

In the present embodiment, the mouse device M2 receives electrical energy in a wired manner. In the present embodiment, the mouse device M2 can be connected to a USB port of a host computer or be electrically connected to a DC or an AC power supply to receive the electrical energy directly.

The mouse device M2 includes a mouse processing module M21 and a mouse primary resonant circuit M22. The mouse processing module M21 is electrically connected to the mouse primary resonant circuit M22.

That is, the mouse device M2 can receive second electrical energy VS2 and transmit wireless electrical energy through the mouse primary resonant circuit M22.

The mouse pad device P2 includes a mouse pad body P20 and a mouse pad secondary resonant circuit P21. The mouse pad secondary resonant circuit P21 is disposed in the mouse pad body P20.

The first secondary resonant circuit K22 of the keyboard device K2, the second secondary resonant circuit K23 of the keyboard device K2 and the mouse pad secondary resonant circuit P21 of the mouse pad device P2 are the same as the secondary resonant circuit of the first embodiment, which is used for passively receiving the wireless electrical energy provided by a primary resonant circuit or a secondary resonant circuit.

In the present embodiment, when the mouse device M2 and the keyboard device K2 are disposed on the mouse pad device P2, wired electrical energy received by the mouse device M2 can be provided to the mouse pad secondary resonant circuit P21 of the mouse pad device P2 through the mouse primary resonant circuit M22.

Then, the mouse pad secondary resonant circuit P21 transmits the received wireless electrical energy to the first secondary resonant circuit K22 or the second secondary resonant circuit K23 of the keyboard device K2.

That is, in the present embodiment, the electrical energy can be transmitted from the mouse device M2 to the mouse pad device P2, and sequentially from the mouse pad device P2 to the keyboard device K2.

In another embodiment, the keyboard device K2 can further include a battery module (not shown in the figures), which is used for charging with the wireless electrical energy received by the first secondary resonant circuit K22 or the second secondary resonant circuit K23.

Beneficial Effects of the Embodiments

In conclusion, one of the beneficial effects of the present disclosure is that, the peripheral device and the keyboard device provided in the present disclosure have a remote magnetic resonance wireless charging function that allows convenient usage and can effectively improve user experience.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A keyboard device, comprising:
   a casing module;
   a processing module;
   a key module including a plurality of key units disposed in the casing module, the processing module being electrically connected to the key module;
   a first secondary resonant circuit disposed in the casing module and disposed on a first side of the casing module; and
   a second secondary resonant circuit disposed in the casing module and disposed on a second side of the casing module, the first side and the second side being opposite sides of the casing module;
   wherein the first secondary resonant circuit or the second secondary resonant circuit provides electrical energy to the processing module and the key module;
   wherein each of the plurality of key units of the key module adjacent to the first secondary resonant circuit or the second secondary resonant circuit is electrically connected to the processing module through an input and output circuit, a communication protocol of the input and output circuit is a single-wired communication protocol, and the communication protocol of the input and output circuit includes a serial peripheral interface or an inter-integrated circuit.

2. The keyboard device according to claim 1, further comprising:
a switching module electrically connected to the first secondary resonant circuit and the second secondary resonant circuit, the switching module being used to switch the first secondary resonant circuit, the second secondary resonant circuit, or the first secondary resonant circuit and the second secondary resonant circuit to receive wireless electrical energy.

3. The keyboard device according to claim 1, wherein the processing module switches the first secondary resonant circuit or the second secondary resonant circuit to receive the wireless electrical energy according to a direction toward which a wireless charging terminal is disposed.

4. The keyboard device according to claim 2, wherein the first secondary resonant circuit includes a first wireless charging coil unit and a first resonant circuit unit, the first resonant circuit unit being electrically connected to the first wireless charging coil unit, and the second secondary resonant circuit includes a second wireless charging coil unit and a second resonant circuit unit, the second resonant circuit unit being electrically connected to the second wireless charging coil unit.

5. The keyboard device according to claim 1, further comprising a shield module, the shield module being in a shape of a flat plate and disposed under the key module to cover part of the plurality of key units of the key module adjacent to the first secondary resonant circuit or the second secondary resonant circuit.

6. The keyboard device according to claim 5, wherein the shield module includes a magnetic conducting plate and a metal sheet, the metal sheet being disposed on a surface of the magnetic conducting plate.

7. The keyboard device according to claim 1, wherein, when the plurality of key units of the key module that are disturbed by a magnetic force, the positions of each of the plurality of key units provide a plurality of key signals in a short time interval, and the key combinations of the key units of the key module are only 1-2 key units apart, the processing module does not transmit the key signals of the key units of the key module.

8. The keyboard device according to claim 7, wherein the short time interval is less than or equal to 50 ms.

9. A peripheral device, comprising:
a keyboard device, the keyboard device receiving electrical energy in a wired manner, the keyboard device including:
a processing module;
a first primary resonant circuit disposed on a first side of the keyboard device; and
a second primary resonant circuit disposed on a second side of the keyboard device, the first primary resonant circuit and the second primary resonant circuit being electrically connected to the processing module;
a mouse device, including:
a mouse processing module and a mouse secondary resonant circuit, the mouse processing module being electrically connected to the mouse secondary resonant circuit; and
a mouse pad device including a mouse pad body and a mouse pad secondary resonant circuit, the mouse pad secondary resonant circuit being disposed in the mouse pad body;
wherein, when the mouse device and the keyboard device are disposed on the mouse pad device, the first primary resonant circuit or the second primary resonant circuit of the keyboard device provides wireless electrical energy to the mouse pad secondary resonant circuit of the mouse pad device, and then the mouse pad secondary resonant circuit transmits the received wireless electrical energy to the mouse secondary resonant circuit of the mouse device.

10. The peripheral device according to claim 9, wherein the keyboard device further includes a key module, the key module includes a plurality of key units disposed in a casing module of the keyboard device, the processing module is electrically connected to the key module, each of the plurality of key units of the key module adjacent to the first primary resonant circuit or the second primary resonant circuit is electrically connected to the processing module through an input and output circuit, a communication protocol of the input and output circuit is a single-wired communication protocol, the communication protocol of the input and output circuit includes a serial peripheral interface or an inter-integrated circuit.

11. The peripheral device according to claim 10, wherein, when the plurality of key units of the key module that are disturbed by a magnetic force, the positions of each of the plurality of key units provide a plurality of key signals in a short time interval, and the key combinations of the key units of the key module are only 1-2 key units apart, the processing module does not transmit the key signals of the key units of the key module.

12. A peripheral device, comprising:
a keyboard device, including:
a processing module;
a first secondary resonant circuit disposed on a first side of the keyboard device; and
a second secondary resonant circuit disposed on a second side of the keyboard device, the first secondary resonant circuit and the second secondary resonant circuit being electrically connected to the processing module;
a mouse device receiving electrical energy in a wired manner, the mouse device including;
a mouse processing module; and
a mouse primary resonant circuit, the mouse processing module being electrically connected to the mouse primary resonant circuit; and
a mouse pad device including a mouse pad body and a mouse pad secondary resonant circuit, the mouse pad secondary resonant circuit being disposed in the mouse pad body;
wherein, when the mouse device and the keyboard device are disposed on the mouse pad device, the electrical energy received by the mouse device is provided to the mouse pad secondary resonant circuit through the mouse first resonant circuit, and then the mouse pad secondary resonant circuit transmits the received electrical energy to the first secondary resonant circuit or the second secondary resonant circuit of the keyboard device.

13. The peripheral device according to claim 12, wherein the keyboard device further includes a key module, the key module includes a plurality of key units disposed in a casing module of the keyboard device, the processing module is electrically connected to the key module, each of the plurality of key units of the key module adjacent to the first secondary resonant circuit or the second secondary resonant circuit is electrically connected to the processing module through an input and output circuit, a communication protocol of the input and output circuit is a single-wired communication protocol, the communication protocol of the input and output circuit includes a serial peripheral interface or an inter-integrated circuit.

14. The peripheral device according to claim 13, wherein, when the plurality of key units of the key module that are disturbed by a magnetic force and the positions of each of the plurality of key units provide a plurality of key signals in a short time interval, and the key combinations of the key units of the key module are only 1-2 key units apart, the processing module does not transmit the key signals of the key units of the key module.

\* \* \* \* \*